United States Patent [19]

Koide et al.

[11] 4,389,995

[45] Jun. 28, 1983

[54] ELECTRONICALLY CONTROLLED FUEL INJECTION METHOD AND APPARATUS

[75] Inventors: Toshikazu Koide, Susono; Takehisa Yaegashi, Mishima, both of Japan

[73] Assignee: Toyota Jidosha Kogyo Kabushiki Kaisha, Toyota, Japan

[21] Appl. No.: 216,433

[22] Filed: Dec. 15, 1980

[30] Foreign Application Priority Data

Oct. 13, 1980 [JP] Japan ................................ 55-141969

[51] Int. Cl.³ ............................................. F02D 5/02
[52] U.S. Cl. .................................... 123/491; 123/179 L
[58] Field of Search ......................... 123/491, 179 L

[56] References Cited

U.S. PATENT DOCUMENTS

| 3,664,311 | 5/1972 | Endo | 123/491 |
| 3,923,031 | 12/1975 | Keranen | 123/491 |
| 4,069,795 | 1/1978 | Long et al. | 123/491 |
| 4,126,107 | 11/1978 | Harada et al. | 123/491 |

Primary Examiner—Charles J. Myhre
Assistant Examiner—Andrew M. Dolinar
Attorney, Agent, or Firm—Cushman, Darby & Cushman

[57] ABSTRACT

In electronically controlling the amount of fuel passing through an electromagnetic valve into an intake system of an engine, the period during which fuel is injected is advanced at low engine temperatures as compared with the fuel injection period at high temperatures. As a result, a sufficiently long duration of time is created from fuel injection until burning, so that the fuel will be more completely atomized even at low engine temperatures, resulting in good fuel combustion.

19 Claims, 4 Drawing Figures

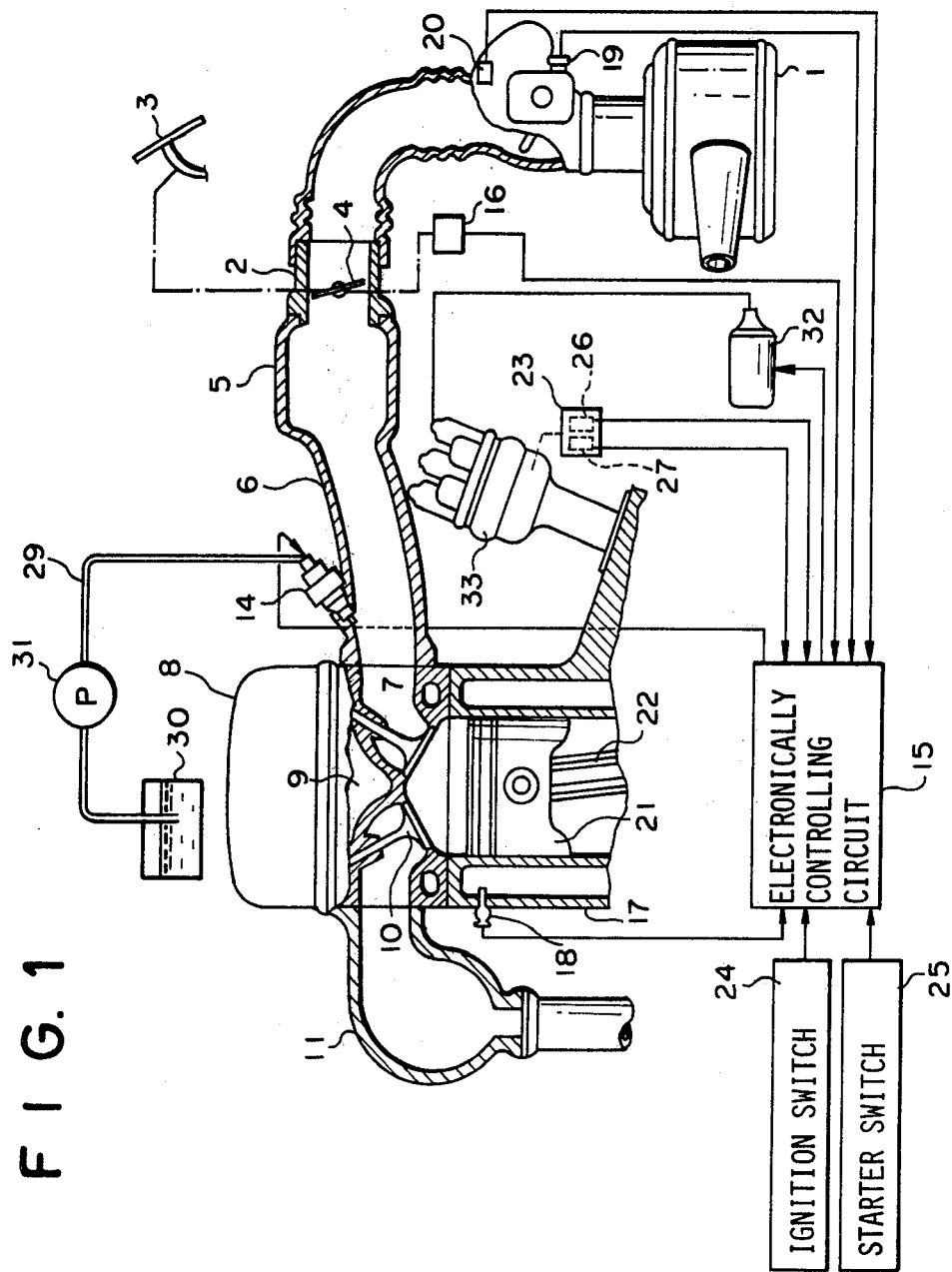
F I G. 1

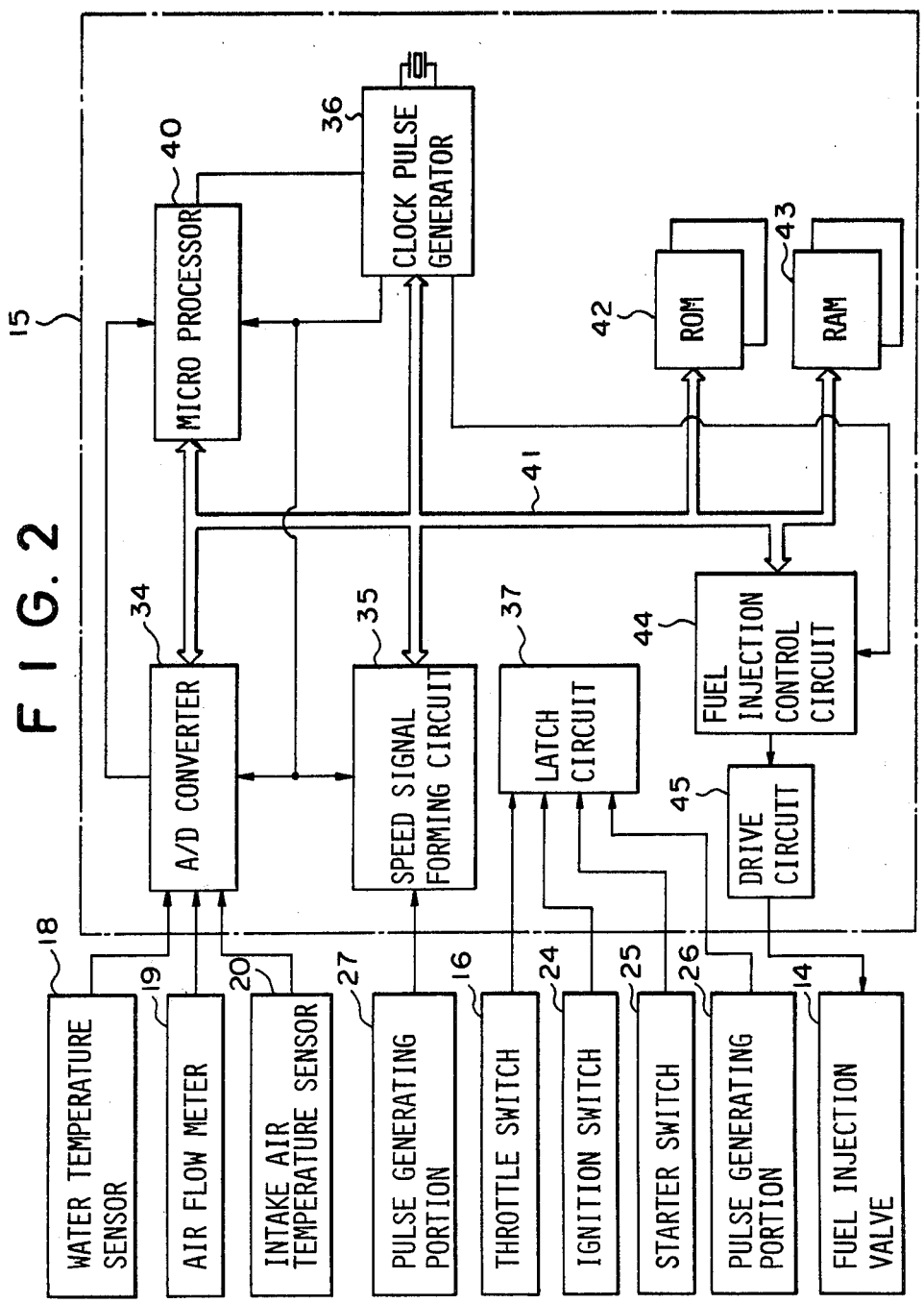

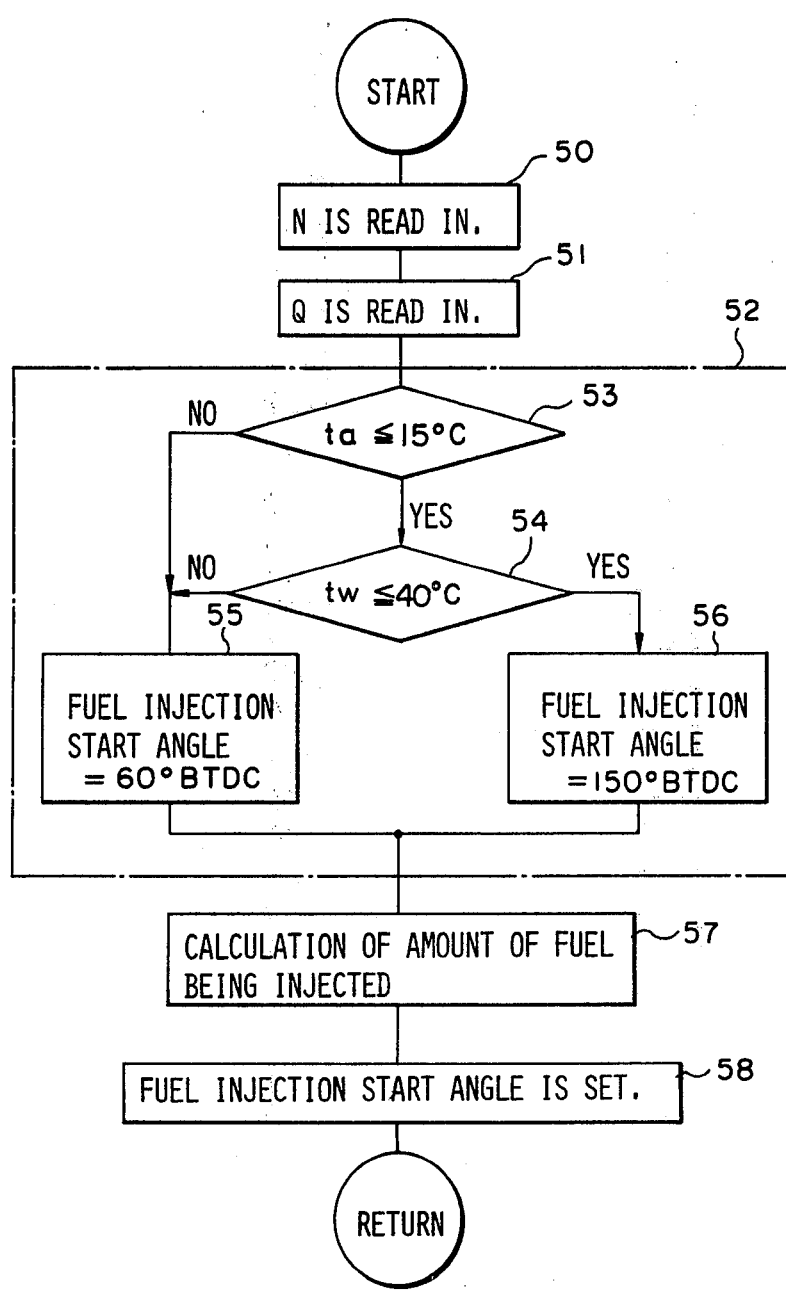

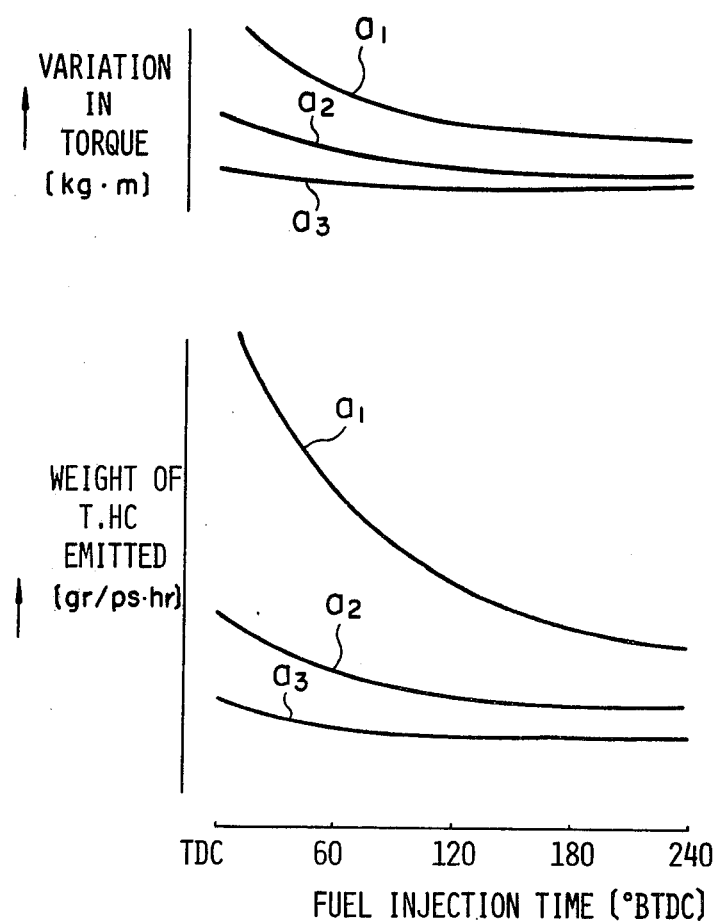

ELECTRONICALLY CONTROLLED FUEL INJECTION METHOD AND APPARATUS

BACKGROUND OF THE INVENTION

1. Field of the Invention

This invention relates to an electronically controlled fuel injection method, wherein an amount of fuel being supplied into an intake system is controlled by operating a fuel injection valve of the intake system by electric signals.

2. Description of the Prior Art

In an electronically controlled fuel injection method, it has been customary to start the injection of fuel through a fuel injection valve at a fixed time or in synchronism with ignition timing irrespective of engine temperature. If an intake stroke starts immediately after fuel injection, the fuel is poorly atomized, particularly at low engine temperatures, thus leading to incomplete combustion, the lowered operational performance of an engine, and release of exhaust gases containing an increased amount of harmful components.

SUMMARY OF THE INVENTION

It is accordingly an object of the present invention to provide an electronically controlled fuel injection method and apparatus, wherein combustion of the air-fuel mixture during engine warm-up and engine performance are improved, and the amount of harmful components in exhaust gases is reduced.

To attain the object, there is provided according to the present invention an electronically controlled fuel injection method, wherein the time at which fuel injection starts at low engine temperatures is earlier than the fuel injection starting time after termination of the engine warm-up period. The increased period from the injection of fuel to the burning of fuel improves the atomization of the fuel, increasing the likelihood that the fuel will burn, stabilizing the running of the engine and decreasing the amount of unburnt harmful components in the exhaust gases.

Preferably, engine temperature is detected by monitoring the engine cooling water temperature. When the engine cooling water temperature is below a predetermined value, for example, below 40° C., the fuel injection starting time is set at a first predetermined value, for example, at 150° before the top dead center of the intake stroke, as viewed from an angle of a crank shaft, and when the engine cooling water temperature is higher than 40° C., the fuel injection starting time is set at a second predetermined value, for example, at 60° before the top dead center of the intake stroke, as viewed from an angle of the crank shaft.

Also, preferably, the fuel injection starting time is more advanced when the temperature of intake air is low as compared to when the intake air temperature is high. A low intake air temperature impairs atomization of a fuel, generally speaking. Advancing the fuel injection starting time at low intake air temperatures promotes atomization of the fuel greatly, and hence the improved burning of the fuel.

BRIEF DESCRIPTION OF THE DRAWINGS

FIG. 1 schematically shows a device to which the electronically controlling fuel injection method of the present invention is to be applied;

FIG. 2 is a block diagram of an electronically controlling section of the device of FIG. 1;

FIG. 3 is a flow chart of a program according to the present invention; and

FIG. 4 is a graph indicating the relationship between fuel injection times and fluctuation in torque and the weight of T.HC being emitted.

DESCRIPTION OF THE PREFERRED EMBODIMENTS

Prior to description of the essential part of the invention, the electronically controlled fuel injection method will be summarized. Referring to FIG. 1, air is drawn under suction from an air cleaner 1, and the flow rate of intake air is controlled by a throttle valve 4 provided in a throttle body 2 and interconnected with an acceleration pedal 3 in a driver's compartment. The intake air is then supplied via a surge-tank 5, an intake air manifold 6 and an intake valve 7 into a combustion chamber 9 in an engine body 8. The mixture charge burnt in the combustion chamber 9 is released in the form of exhaust gases via an exhaust valve 10 and an exhaust manifold 11 to atmosphere. A fuel injection valve 14 is provided in the intake air manifold 6 in an opposed relation to each combustion chamber 9. An electronic controlling section 15 includes a microprocessor serving as a computation section, ROM,RAM and filters, and receives input signals from a throttle switch 16 for detecting the fully-closed throttle valve 4, a water temperature sensor 18 attached to a water jacket 17 of the engine body, an air flow meter 19 for detecting a flow rate of intake air provided between the air cleaner 1 and the throttle valve 4, an intake air temperature sensor 20 for detecting a temperature of intake air, a rotational angle sensor 23 for detecting an angle of rotation of a distributor shaft connected to a crank shaft, so as to detect an angle of rotation of the crank shaft, which in turn is connected by way of a connecting rod 22 to a piston 21, an ignition switch 24 in the driver's compartment and a starter switch 25. The rotational angle sensor 23 has a portion 26 for generating a single pulse per two cycles of rotation of the crank shaft, and a portion 27 for generating pulses at a predetermined angle of the crank shaft, for example, at every 30°. Fuel is supplied under pressure by a fuel pump 31 from a fuel tank 30 through a fuel line 29 into the fuel injection valve 14. The electronic controlling section 15 computes an amount of fuel being injected and a fuel injection time, according to input signals fed thereto, as well as computes an ignition time, thereby supplying a current to an ignition coil 32. A secondary current at the ignition coil 32 is supplied to a distributor 33.

FIG. 2 is a block diagram of the electronic controlling section 15. The outputs of the water temperature sensor 18, the air flow meter 19 and the intake air temperature sensor 20 are transmitted to an A/D converter 34, thereby being converted into digital signals. A speed signal forming circuit 35 includes a gate adapted to opened and closed pulses from the portion 27 of the rotational angle sensor 23, and a counter for counting clock pulses which are fed via the aforesaid gate from a clock-pulse generator 36. Values reversely proportional to an engine running speed N are generated as outputs of the counter. The outputs of the throttle switch 16, the ignition switch 24, the starter switch 25 and the portion 26 of the rotational angle sensor 23 are temporarily stored in a latch circuit 37. The microprocessor 40 is connected via a bus 41 to ROM 42, RAM 43 and other blocks 34, 35 and 37, and computes an amount of fuel being injected, according to a predetermined program. Values equivalent to the fuel injection time thus computed are stored in a fuel injection control circuit 44. The values thus stored are subtracted from a predetermined value one by one, according to clock pulses, and until the count becomes zero, pulses are formed at the output terminal of a fuel injection control circuit 44. The pulses thus formed are transmitted via a drive circuit 45 to the fuel injection valve 28.

FIG. 3 shows a flow chart of the program for computing a fuel injection time and an amount of fuel being injected. This program is started according to interruption signals from the portions 26 and 27 of the rotational angle sensor 23. At steps 50 and 51, a running speed N of an engine and a flow rate of intake air Q are read in, respectively, and the program proceeds on to a section 52 for selecting a fuel injection start angle. In this section, at a step 53, whether or not the intake air temperature is below 15° C. is discriminated. If the answer is YES, the program proceeds on to a step 54, and if NO, the program proceeds on to a step 55. At the step 54, whether or not the engine cooling water temperature, related to the engine temperature, is below 40° C. is discriminated. If the answer is YES, then the program proceeds on to a step 56, and if NO, the program proceeds on to a step 55. At the step 55, a fuel injection start angle is set at 60° before the top dead center of the intake stroke, and at the step 56, a fuel injection start angle is set at 150° before the top dead center of the intake stroke. At a step 57, an amount of fuel being injected is calculated according to N and Q, and at a step 58, the fuel injection start angle selected at the section 52 is set in a given register. The interruption program is thus terminated.

FIG. 4 shows the relationship between the fuel injection starting times and variation in torque and the weight of T.HC (all of carbon-hydrogen compounds) emitted, taking an engine cooling temperature as a parameter. Fuel injection starting times are indicated at every unit crank angle before the top dead center of the intake stroke, wherein curves a1, a2 and a3 indicate the characteristics at 20° C., 40° C. and 80° C. in engine cooling water temperature, respectively. From FIG. 4, it is seen that, as the fuel injection time is advanced, variations in torque and the weight of T.HC emitted are reduced. As the fuel injection starting time is advanced, calculation of the amount of fuel being injected must be finished more quickly. This would impair the responsiveness of the engine, particularly, at transitions such as during acceleration. Therefore, advanced fuel injection starting time must be avoided. However, at low engine temperatures, it is desirable to control torque variations and the weight of T.HC compounds being emitted even at the sacrifice of engine responsiveness during transitions. In the embodiment, since the fuel injection time is set at 150° before the top dead center of the intake stroke and at 60° before the top dead center of the intake stroke when the engine cooling water temperature is below 40° C. and above 40° C., respectively, variations in torque and the weight of T.HC compounds being emitted at low engine temperatures are reduced. Low temperature intake air, in general, would impair atomization of the fuel as does low engine temperatures. In the preferred embodiment, however, the fuel injection starting time also changes according to a the intake air temperature, and fluctuation in torque due to low intake air temperatures is avoided.

According to the present invention, the fuel injection time is not fixed, irrespective of an engine temperature. The fuel injection time at low engine temperatures is advanced, as compared with high engine temperatures, with the result that the atomization of fuel to a given level is ensured even at low engine temperatures, and the fluctuation in torque as well as the amount of harmful unburnt components, such as T.HC, being released is reduced.

What is claimed is:

1. A method of electronically controlling fuel injection in an engine comprising the steps of:
    controlling the amount of fuel supplied to said engine by generating an electric signal for operating a fuel injection valve in an intake system of said engine; and
    advancing the time at which fuel injection begins with respect to the time that an intake valve of said engine opens when said engine is at a low temperature as compared to when said engine is at a high temperature, said advancing occurring only when a temperature of intake air is below a predetermined value.

2. A method as defined in claim 1, wherein the engine temperature is detected by detecting the temperature of engine cooling water.

3. A method as defined in claim 2, wherein said advancing step includes the step of setting said fuel injection beginning time at a first predetermined value when said cooling water temperature is below a predetermined value, and setting said fuel injection beginning time at a second value delayed compared to said first predetermined value with respect to the time that an intake valve of said engine opens when said cooling water temperature is above said predetermined value.

4. A method as defined in claim 3, wherein said predetermined cooling water temperature value is 40° C.

5. A method as defined in claim 4, wherein said first predetermined value is 150° before the top dead center of the intake stroke, as viewed from an angle of a crank shaft.

6. A method as defined in claim 5, wherein said second value is 60° before the top dead center of the intake stroke, as viewed from an angle of the crank shaft.

7. A method as defined in claim 2, 3, 4, 5, 6 or 1, further comprising the step of also advancing the time at which fuel injection begins when air taken into said engine is at a low temperature, as compared to when air taken into said engine is at a high temperature.

8. A method as defined in claim 7, wherein said also advancing step includes the step of advancing with respect to the time that an intake valve of said engine opens, by a predetermined duration, said fuel injection beginning time at an intake air temperature lower than a predetermined value as compared to said fuel injection beginning time at an intake air temperature higher than said predetermined value.

9. A method as defined in claim 8, wherein said predetermined value of the intake air temperature is 15° C.

10. Apparatus for electronically controlling a fuel injection valve in an engine comprising:
    means for sensing a temperature of said engine;
    means for sensing intake air temperature; and
    means, responsive to both said sensing means, for (1) generating an electric signal for operating said fuel injection valve, and (2) advancing the time at which fuel injection begins with respect to the time that an intake valve of said engine opens when said engine is at a low temperature as compared to when said engine is at a high temperature, said generating and advancing means advancing said fuel injection beginning time only when an intake air temperature is below a predetermined value.

11. Apparatus as defined in claim 10, wherein said engine temperature sensing means includes means for detecting the temperature of cooling water in said engine.

12. Apparatus as defined in claim 11, wherein said generating and advancing means sets said fuel injection beginning time at a first predetermined value when said cooling water temperature is below a predetermined value, and sets said fuel injection beginning time at a second value delayed compared to said first predetermined value with respect to the time that an intake valve of said engine opens when said cooling water temperature is above said predetermined value.

13. Apparatus as defined in claim 12, wherein said predetermined cooling water temperature value is 40° C.

14. Apparatus as defined in claim 13, wherein said first predetermined value is 150° before the top dead center of an intake stroke, as viewed from an angle of a crankshaft in said engine.

15. Apparatus as defined in claim 14, wherein said second value is 60° before the top dead center of an intake stroke, as viewed from an angle of said crankshaft.

16. Apparatus as defined in claim 10, 11, 12, 13, 14 or 15, wherein:
said generating and advancing means advances the time at which fuel injection begins with respect to a time that an intake valve of said engine opens when intake air is at a low temperature, as compared to when said intake air is at a high temperature.

17. Apparatus as defined in claim 16, wherein said generating and advancing means advances, with respect to the time that an intake valve of said engine opens, by a predetermined duration, said fuel injection beginning time at an intake air temperature lower than a predetermined value as compared to said fuel injection beginning time at an intake air temperature higher than said predetermined value.

18. Apparatus as defined in claim 17, wherein said predetermined value of intake air temperature is 15° C.

19. Apparatus for electronically controlling a fuel injection valve in an engine comprising:
means for detecting the temperature of cooling water in said engine; and
means, responsive to said detecting means, for (1) generating an electric signal for operating said fuel injection valve, and (2) setting the moment when fuel injection begins at a crankshaft angle of 150° before the top dead center of an intake stroke when said cooling water temperature is below a predetermined value, and at a crankshaft angle of 60° before the top dead center of an intake stroke when said cooling water temperature is above said predetermined value.

* * * * *